United States Patent [19]

Bordenave et al.

[11] 4,011,820
[45] Mar. 15, 1977

[54] METHOD AND MEANS FOR STABILIZING AND POSITIONING A TROLLEY HANGER RELATIVE TO A CONVEYOR RAIL

[75] Inventors: Joseph Heber Bordenave, South San Francisco; Robert Falls, Millbrae, both of Calif.

[73] Assignee: The Cincinnati Butchers' Supply Company, Cincinnati, Ohio

[22] Filed: Sept. 26, 1975

[21] Appl. No.: 617,009

[52] U.S. Cl. .................................... 104/97; 17/24; 104/127
[51] Int. Cl.² ................................... B61B 3/00
[58] Field of Search ............ 104/96, 97, 122, 127, 104/128, 129; 214/95 R, 622; 17/24

[56] References Cited
UNITED STATES PATENTS

| | | | |
|---|---|---|---|
| 2,236,605 | 4/1941 | Ozouf | 17/24 X |
| 2,401,942 | 6/1946 | Le Fiell | 104/97 X |
| 2,555,072 | 5/1951 | Zaenkert | 104/97 X |
| 2,741,384 | 4/1956 | Duval et al. | 214/622 |
| 3,111,706 | 11/1963 | Kopp | 17/24 |
| 3,761,998 | 10/1973 | Schmidt | 17/24 |

Primary Examiner—Robert J. Spar
Assistant Examiner—Randolph A. Reese
Attorney, Agent, or Firm—J. Warren Kinney, Jr.

[57] ABSTRACT

A hoist mechanism is activated to elevate a trolley hanger from a lowered position to a predetermined position adjacent and above a conveyor rail after which the hanger is stabilized and the rail-engaging wheel of the trolley hanger is positioned in vertical alignment with the rail. The rail engaging wheel is then landed on the rail, the stabilizing force is removed and the hoist mechanism descends to a lowered position.

28 Claims, 8 Drawing Figures

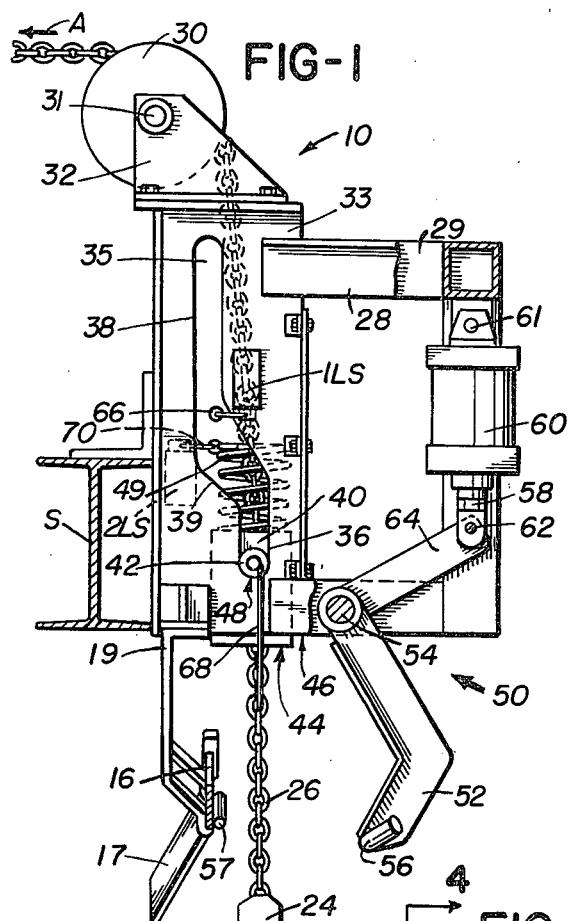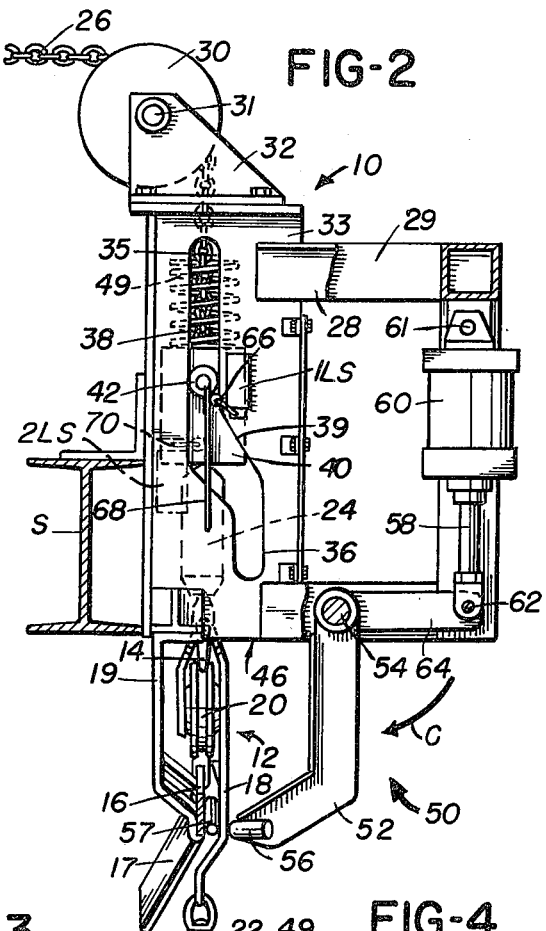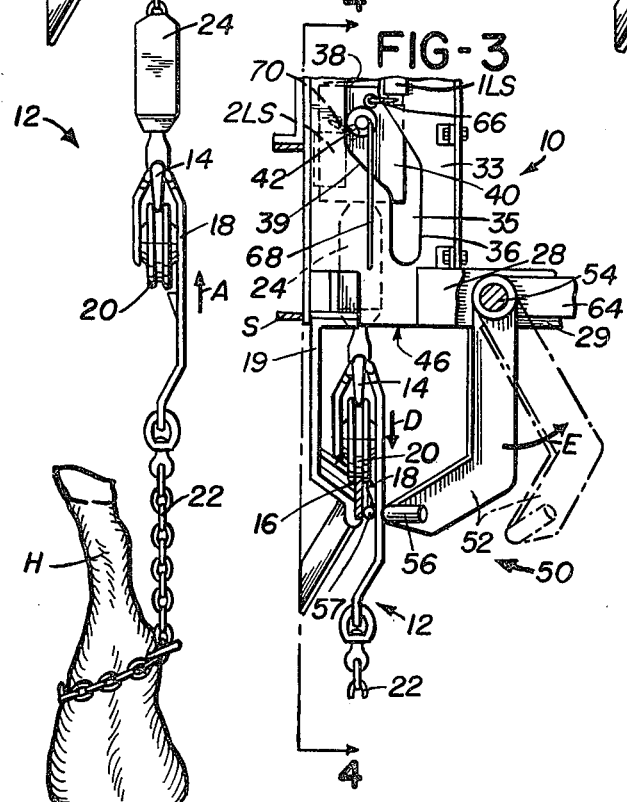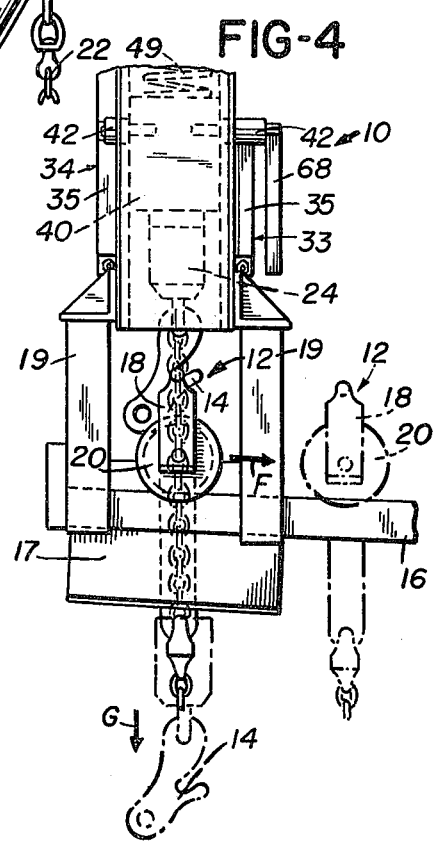

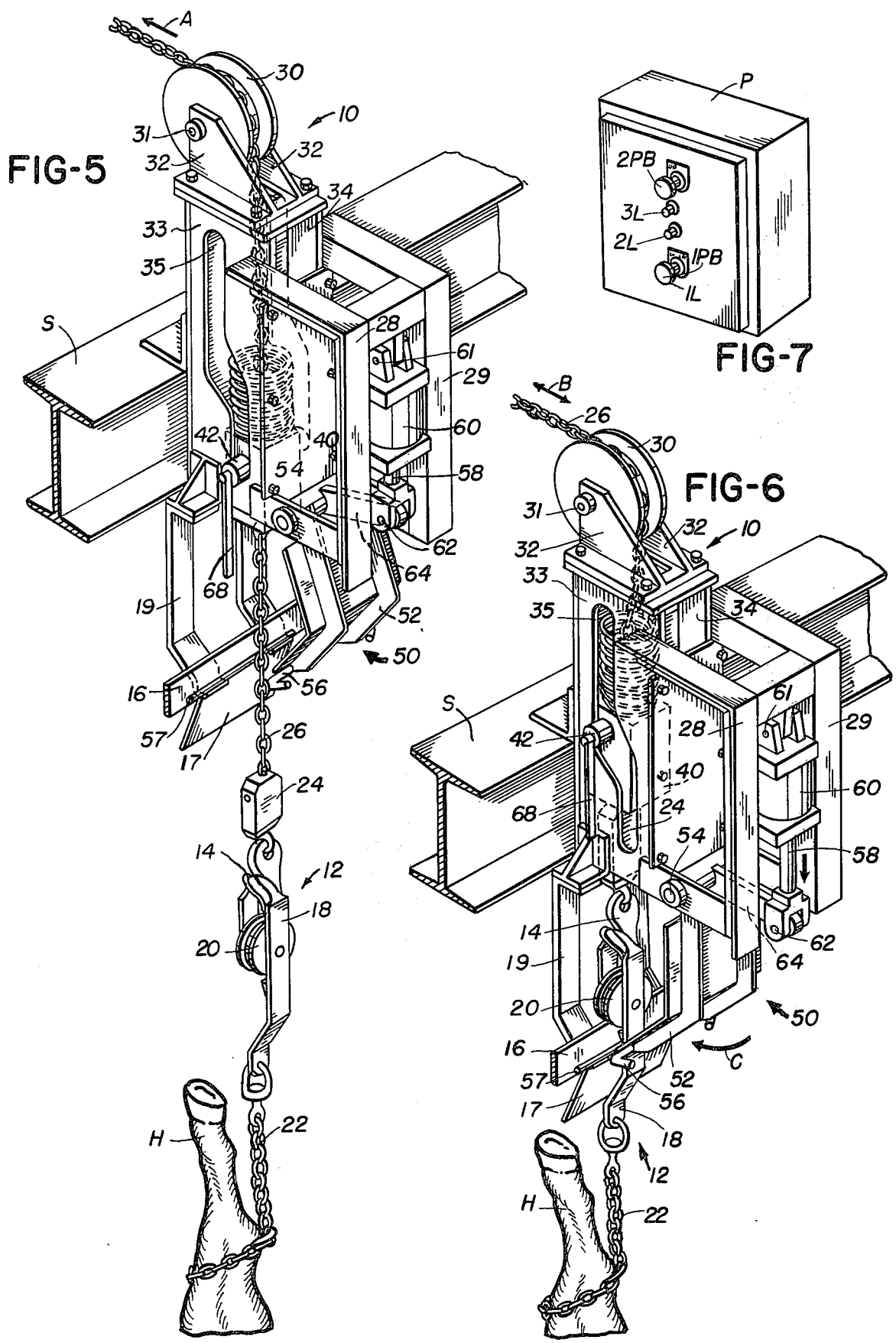

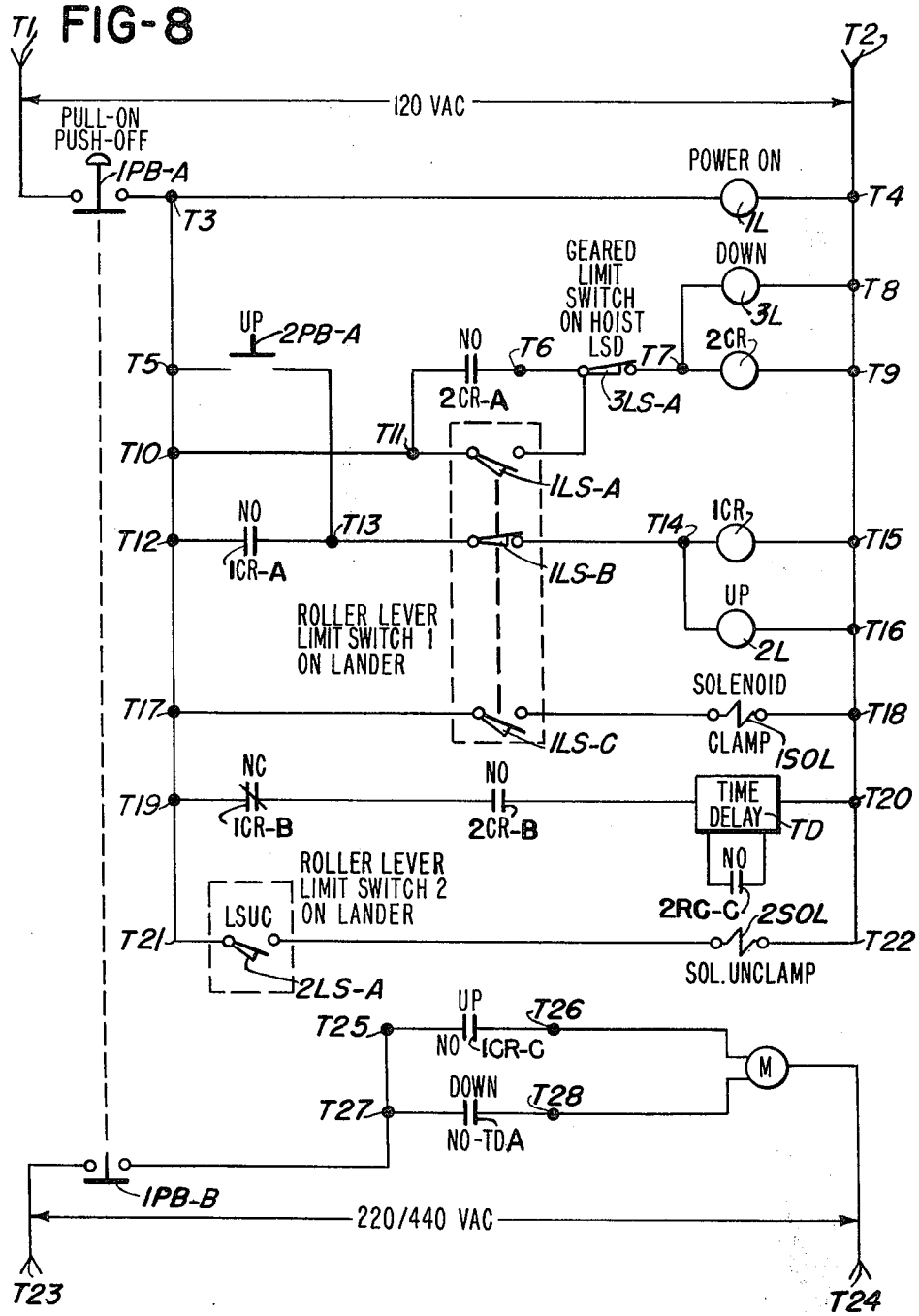

METHOD AND MEANS FOR STABILIZING AND POSITIONING A TROLLEY HANGER RELATIVE TO A CONVEYOR RAIL

BACKGROUND OF THE INVENTION

1. Field of the Invention

The present invention is directed to a stabilizer means for selectively engaging, stabilizing and positioning a trolley hanger relative to a conveyor rail, and to the method of hoisting, stabilizing and landing the trolley hanger on the conveyor rail.

2. Description of the Prior Art

By way of background, it should be noted that when livestock, particularly beef, is being slaughtered, each animal is rendered unconscious and while unconscious a shackle is secured around a hind leg of the animal, after which the trolley hanger of the shackle is securely, though releasably, associated with the hook of a hoist mechanism for raising the animal to an overhead rail section from which it is suspended.

The rate of kill, and variations in the size and weight of the slaughtered animal make it desirable that the means by which the animal is lifted from the kill floor to a suspended position from an overhead rail section be as rapid and foolproof as possible.

LeFiell U.S. Pat. No. 2,401,492, discloses a carcass hoist and landing device which includes means for elevating a beef bleeding shackle from the kill floor to an elevated conveyor rail section for suspending the carcass therefrom by a hind leg. Elevation of the shackle causes the trolley hanger thereof to be dragged upwardly along the side of a striker plate, and then over the upper edge of the elevated rail section, onto which the trolley wheel is lowered incident to descent of the hoist mechanism.

The present invention is readily distinguishable from the device of the LeFeill Patent.

SUMMARY OF THE INVENTION

The present invention enables an operator to quickly and safely elevate an animal from its position on the kill floor to an elevated position where it is suspended from an overhead rail section by merely pushing a button on a control panel once the shackle has been looped around the leg of the animal which is being slaughtered and the trolley hanger of the shackle is securely, though releasably, attached to the hoist mechanism. The hoist mechanism automatically elevates the trolley hanger and shackle from the kill floor to a position above a conveyor rail section. Once the trolley hanger is fully elevated, stabilizing means engage the trolley hanger for stabilizing it against undesirable swinging action, and for positioning the rail-engaging wheel of the trolley hanger in vertical alignment with the conveyor rail section. The hoist mechanism then automatically lands the rail-engaging wheel onto the rail section, after which the stabilizing means is disengaged, and the hoist mechanism descends to the kill floor.

While the hoist mechanism, clamp or stabilizer means and a section of trolley rail are described and shown as an integral unit, it should be understood that the stabilizer means and method of the present invention may be readily incorporated in existing hoist mechanisms and conveyor systems.

The stabilizer means is automatically controlled in response to hoist or trolley hanger position by a series of limit switches which are mounted on the frame of the hoist mechanism. When the trolley hanger is fully elevated, a first limit switch is activated, whereby the means engages and clamps the hanger and positions the wheel of the trolley hanger in vertical alignment with the conveyor rail section. Once the stabilizer means engages the trolley hanger, the hoist mechanism descends and automatically lands the rail-engaging wheel of the trolley hanger on the rail section. This activates a second limit switch for releasing the stabilizer means. The hoist mechanism continues its descent until it reaches the fully lowered position.

It is, therefore, a primary object of the present invention to provide the method and means by which a trolley hanger which has been elevated to a position adjacent an elevated conveyor rail is stabilized and by which a rail engaging wheel of the hanger is positioned in vertical alignment with the rail.

It is another object of the invention to provide in combination with the stabilizer means a device for automatically hoisting a trolley hanger, wherein the hanger, once secured to a hoist mechanism, is elevated to a position above a conveyor rail section, is stabilized, and is thereafter automatically lowered to land the rail engaging wheel thereof on the conveyor rail section.

It is yet another object to provide an integral hoist mechanism, stabilizer means and rail section which may be readily incorporated in existing conveyor systems by removing a section of rail therefrom and installing the device of the present invention in its place.

Other objects and features of the present invention will be readily apparent from the accompanying drawings and description of the preferred embodiments.

BRIEF DESCRIPTION OF THE DRAWINGS

FIG. 1 is a side view of the positioning device of the subject invention and illustrates the relationship of the various components thereof when the trolley hanger is ascending from a lowered position.

FIG. 2 is a view similar to FIG. 1 and illustrates the relationship of the various components of the device when the trolley hanger has ascended to the fully elevated position.

FIG. 3 illustrates the relationship of the various components of the device when descending from a fully elevated position to land the rail-engaging wheel on a conveyor rail section.

FIG. 4 is a view taken at line 4—4 of FIG. 3.

FIG. 5 is a perspective view illustrating the relationship of the components of the device when the trolley hanger is in the position of FIG. 1.

FIG. 6 is a perspective view illustrating the relationship of the components of the device when the trolley hanger is in the position of FIG. 2.

FIG. 7 is a perspective view of a control panel for controlling the operation of the subject device.

FIG. 8 is a diagrammatic view of exemplary electrical control circuitry for controlling the cycle of operation of the device.

DESCRIPTION OF THE PREFERRED EMBODIMENTS

The subject device includes hoist mechanism 10 for elevating a trolley hanger 12 to a position adjacent an overhead conveyor rail 16 (FIG. 2) and for automatically landing wheel 20 of the trolley hanger on the rail (FIG. 4), and stabilizer means 50 which is secured to and carried by hoist mechanism 10 and is adapted for stabilizing the trolley hanger 12 against swinging action and for automatically positioning trolley wheel 20 in vertical alignment with rail 16 once the trolley hanger is raised to the fully elevated position. After the trolley wheel is landed on rail 16, means 50 is disengaged from the trolley hanger.

Stabilizer means 50 may be used in combination with the hoist mechanism particularly shown and described, or with other, known hoist mechanisms adapted for lifting a trolley hanger to a position above a conveyor rail.

The stabilizer means is mounted in a support frame comprising a pair of U-shaped structural members 28, 29 which are secured to hoist mechanism 10 at either side of hoist chain 26 (FIGS. 5 and 6). In the preferred embodiment, the stabilizer means comprises a projecting arm 52 pivotally mounted to members 28, 29 at 54; a control arm 64 mounted to and projecting outward from arm 52; and an actuator comprising piston 58 and cylinder 60, wherein piston 58 is pivotally coupled to control arm 64 at 62 and cylinder 60 is pivotally mounted on members 28, 29 at 61.

The free outer end of arm 52 includes a trolley hanger engaging abutment 56. A positive step 57 is secured to and carried by rail 16 and is in substantial alignment with abutment 56. Arm 52 is movable between an unclamped, retracted position (FIG. 1) and a clamped, advanced position (FIG. 2) wherein abutment 56 urges trolley hanger 12 against stop 57 and positions wheels 20 in vertical alignment with rail 16.

The position of arm 52 is controlled by the piston and cylinder actuator, whereby advancement of piston 58 outwardly from cylinder 60 moves abutment 56 into the clamped position (FIG. 2) and retraction of piston 58 into the cylinder moves abutment 56 to the retracted, unclamped position (FIG. 1).

When the trolley hanger is elevated to a position above rail 16 and abutment 56 is advanced into clamping engagement with trolley hanger 12, the trolley hanger is stabilized to eliminate swinging action relative to rail 16. The trolley wheel may then be lowered onto rail 16, afterwhich piston 58 is retracted into cylinder 60 and abutment 56 is retracted to the unclamped position, as illustrated by arrow E (FIG. 3).

The hoist mechanism 10 includes a pair of spaced cam plates 33, 34 (FIG. 4) which are adapted to be rigidly mounted on support structure S above a section of conveyor rail 16. In the preferred embodiment, rail section 16 is an integral part of the hoist mechanism and is mounted in depending relationship with cam plates 33, 34 via a pair of elongate rail supports 19, 19. Thus, the device of the subject invention may be incorporated in an existing conveyor system by removing a predetermined length of conveyor rail therefrom and installing the rail section 16 of the subject device in its place.

Hoist chain 26 passes through the space between cam plates 33, 34 and includes a lower end which terminates in chain block 24. A trolley hanger engaging hook 14 depends from block 24 and is adapted for securely, though releasably, engaging frame 18 of trolley hanger 12, whereby advancement of chain 26 in the direction of arrow A (FIG. 1) elevates the trolley hanger from a fully descended position to an elevated position above conveyor rail 16 (FIG. 2).

Striker plate 17 is secured to and depends from rail 16 and is adapted for guiding the trolley hanger 12 around rail 16 as it is elevated from a lowered position.

Rail engaging trolley wheel 20 is rotatably mounted in the upper end of frame 18 and is positioned above the rail 16 when the trolley hanger is in a fully elevated position (FIG. 2). The wheel is adapted for securely engaging rail 16 when the hoisting mechanism descends from the fully elevated position (FIGS. 3 and 4). As the wheel is seated or landed on rail 16, the hoist chain 26 and hook 14 descend in the direction of arrow G, and hook 14 automatically releases the trolley hanger.

Shackle chain 22 is secured to and carried by the lower end of frame 18 and is adapted to be suitably shackled or looped about the hind leg H of an animal which is to be slaughtered.

Plates 32 are rigidly secured to and project upwardly from cam plates 33, 34. Hoist pulley 30 is rotatably mounted in plates 32 at 31 and is adapted for receiving chain 26 for guiding it to means for selectively winding and unwinding the chain in response to rotation of the shaft (not shown) of reversible motor M (FIG. 8) for effecting the ascent and descent of hook 14.

Each cam plate 33, 34 includes an elongate cam defining channel 35 having a lower vertical portion 36 which is spaced transversely outward from rail 16, an upper vertical portion 38 which is in substantial alignment with rail 16, and a transition portion 39 for connecting the upper and lower vertical portions.

Chain block guide 40 is slidably mounted between cam plates 33 and 34 and includes a pair of projecting cam followers 42 which are engaged by channels 35. When the chain block 24 is in the lowered position, cam followers 42 are at rest against the lower terminal end 48 of channel 35 and lower surface 44 of guide 40 is adjacent the lower ends 46 of cam plates 33, 34.

Chain block guide 40 includes a central through passageway for receiving and loosely accomodating hoist chain 26. As the hoist chain is advanced in the direction of arrow A, chain block 24 ascends and engages the undersurface 44 of guide 40. The guide then advances with the chain and is guided by channels 35 of cam plates 33, 34 wherein cam followers 42 shift from the lower channel portion 36 to the upper channel portion 38 for positioning the wheel of the trolley hanger in substantial alignment with rail section 16 (FIG. 2).

A shock absorbing element such as spring 49 is mounted on and projects upwardly from guide 40 and is adapted for abutting the lower surfaces of plates 32. As the hoist chain, chain block, trolley hanger and shackle chain approach the fully elevated position, the spring acts as a cushion and dissipates the upward force generated by the inertia of the large animal carcass which is being elevated.

In the preferred embodiment, frame members 28, 29 of stabilizer means 50 are rigidly secured to cam plates 33, 34, respectively, see FIGS. 5 and 6, whereby arm 52 is movable into and out of engagement with frame 18 of trolley hanger 12 for urging the frame into positive stop 57 on rail 16.

Uniformly satisfactory results have been obtained in those instances wherein the hoisting, stabilizing and landing operations have been controlled by means such as the exemplary electrical control circuit illustrated in FIG. 8. The control circuit is responsive to selective activation of control elements such as, by way of example, limit switches 1LS and 2LS mounted on hoist mechanism 10 (as shown in FIGS. 1, 2 and 3) and limit switch 3LS (not shown) mounted in control linkage associated with motor M. A control panel P for starting and stopping the cycle of operation is illustrated in FIG. 7. It will be noted that control panel P includes indicator lights 1L, 2L and 3L which are selectively illuminated to indicate the particular phase of the cycle as the hoisting, stabilizing and landing operations are performed.

Initially, hoist chain 26 of the hoist mechanism is in fully descended position, whereby the hind leg H of an animal carcass may be shackled, and the trolley hanger 12 and shackle chain 22 secured to hook 14. Push-pull button 1PB on control panel P is pushed to close contacts 1PB-A and complete the circuit from terminal T-1 through terminals T-3, T-5, T-10, T-12, T-19 and T-21 and energize the control circuit. Contacts 1PB-B are in tandem with contacts 1PB-A and are similarly closed to complete the circuit from terminal T-23 through terminals T-25 and T-27 and energizes the power circuit for motor M. When terminal T-3 is energized, the circuit is closed between terminals T-1, T-3, T-4 and T-2 and light 1L on control panel P is illuminated, indicating that the power is "on".

As illustrated in FIGS. 1–6, control arm 66 of limit switch 1LS is disposed in the path of movement of elongate member 68 which is secured to and carried by cam follower 42 of guide 40. The control arm is normally resiliently urged into an extended, deactivated position (FIG. 1), wherein the contacts 1LS-A, 1LS-B and 1LS-C are in the normal position, as shown in FIG. 8. The control arm is depressed and activated when engaged by member 68 (FIG. 2), whereby contacts 1LS-A, 1LS-B and 1LS-C are switched to the activated position for selectively closing the circuits between terminals T-11, T-6 and terminals T-17, T-18, and for selectively opening the circuit between terminals T-13, T-14.

When chain block 24 is below the lower ends 46 of cam plates 33, 34, guide 40 is in the position of FIG. 1 and the contacts 1LS-A, 1LS-B and 1LS-C are in the normal position.

Therefore, depression of pushbutton 2PB closes the contacts 2PB-A between terminals T-5 and T-13, and completes the circuit through terminals T-14, and T-15, energizing control relay 1CR.

The contacts 1CR-A (normally open), 1CR-B (normally closed) and 1CR-C (normally open) are shifted from their normal de-energized states (shown in FIG. 8) to their energized states.

This closes the circuit between terminals T-12 and T-13, whereby control relay 1CR remains energized after pushbutton 1PB is released and contacts 2PB-A return to the normal, open condition.

Contacts 1CR-C are closed, completing the circuit between terminals T-25 and T-26, energizing motor M. Hoist chain 26 is advanced in the direction of arrow A (FIGS. 1 and 5) and trolley hanger 12 is elevated. It will be noted that light 2L on panel P is in the circuit between terminals T-14 and T-16 and is illuminated whenever control relay 1CR is energized, indicating the cycle is in the "UP" phase.

Normally closed contacts 1CR-B between terminals T-19 and T-20 are open to preclude completion of the circuit to time delay TD while control relay 1CR is energized.

The "UP" phase continues the entire time 1CR is energized. As hoist chain 26 advances in direction of arrow A, block 24 engages lower surface 44 of guide 40, whereby the guide moves upwardly in the frame and the cam followers 42 advance in channels 35 in the cam plates. When the projecting member 68 of the cam follower engages arm 66 of limit switch 1LS, the arm is elevated and activated, whereby contacts 1LS-A, 1LS-B and 1LS-C associated with limit switch 1LS are shifted from the normal, deactivated position of FIG. 8 to the activated position.

Contacts 1LS-B are opened, and the circuit between terminals T-13 and T-14 is opened, whereby control relay 1CR is de-energized. Contacts 1CR-C are returned to the normal, de-energized open position, whereby the circuit between terminals T-25 and T-26 is opened, and motor M is de-energized stopping the ascent of trolley hanger 12 at the position shown in FIGS. 2 and 6. It will be noted that light 2L is de-energized when contact relay 1CR is de-energized, indicating that the cycle is out of the "UP" phase.

Contacts 1LS-C are closed between terminals T-17 and T-18 and energize solenoid 1-SOL which is suitably coupled to the piston and cylinder actuator. Piston 58 is extended and arm 52 is advanced from the position of FIG. 1 to the position of FIG. 2, as indicated by arrow C, for engaging and stabilizing trolley hanger frame 18 between abutment 56 and stop 57.

Contacts 1-LSA are closed between terminals T-11 and T-6 and, since contacts 3LS-A are in the normally closed position, control relay 2CR is energized. When control relay 2CR is energized, normally open contacts 2CR-A are closed between terminals T-11 and T-6, whereby control relay 2CR remains energized after control arm 66 of limit switch 1LS is disengaged from member 68 and deactivated. It will be noted that light 3L on panel P is in the circuit between terminals T-7 and T-8 is illuminated when relay 2CR is energized, indicating the cycle is in a "DOWN" phase.

Normally open contacts 2CR-B are closed, and since control relay 1CR is de-energized and contacts 1CR-B are normally closed, the circuit between terminals T-19 and T-20 is closed, energizing the time delay circuit TD. Time delay circuit TD provides a pause in the cycle when the hoist chain and hook has reached the fully elevated position, permitting stabilizer means 50 to effectively dampen out any swinging action before descent of the trolley hanger toward rail 16.

Normally open contacts 2CR-C are also closed and initiate the "COUNT-DOWN" in time delay TD. After a predetermined time interval, time delay TD is energized and normally open contacts TD-A close the circuit between terminals T-27 and T-28, thereby energizing the motor M in the unwind direction. Hoist chain 26 descends in the direction of arrow D (FIG. 3) and automatically lands wheel 20 of the trolley hanger on rail 16.

As the hoist chain 26, block 24 and hook 14 descend, guide 40 moves downward in channels 35 and control arm 66 of limit switch 1LS is released. Contacts 1LS-A, 1LS-B and 1LS-C return to the normal, deactivated position of FIG. 8. Control relay 2CR remains energized via closed contacts 2CRA, and control relay 1CR remains de-energized since contacts 1CR-A are in the normally open position. Solenoid 1SOL is de-energized. It should, however, be understood that arm 52 remains in the advanced, trolley hanger position until means are energized to retract piston arm 58 into cylinder 60.

As illustrated in FIGS. 1–3, control arm 70 of limit switch 2LS is disposed in the path of and is engaged by cam follower 42 as it ascends and descends in channel 35. The control arm is normally resiliently urged into an extended, deactivated position (FIG. 1), wherein the contacts 2LS-A are in the normal open position shown in FIG. 8. The control arm remains deactivated when it is engaged and deflected upwardly by the cam follower as it ascends in channel 35, whereas the control arm is deflected into a depressed, activated state (FIG. 3) when engaged by the cam follower as it descends in channel 35 for landing trolley hanger 12 on rail 16. When the control arm is in the activated state, contacts 2LS-A are shifted to the activated, closed position for closing the circuit between terminals T-21 and T-22. This energizes solenoid 2SOL, which is suitably coupled to the piston and cylinder actuator for retracting piston 58 into cylinder 60 and for disengaging arm 52 from the trolley hanger, as indicated by arrow E. (FIG. 3).

The trolley hanger is then free to advance along rail 16 as indicated by arrow F (FIG. 4). Cam follower 42 continues to descend and control arm 70 of limit switch 2LS is released, whereby the control arm returns to the normal, deactivated position of FIG. 1, and contacts 2LS-A are opened for de-energizing solenoid 2SOL.

Since control relay 2CR remains closed, the hoist chain 26 and hook 14 continue to descend as indicated by arrow G in FIG. 4. The chain descends until hook 14 has reached a fully lowered position, which is detected by activation of a geared limit switch 3LS (not shown) on the hoist motor M. The normally closed contacts 3LS-A are then activated to open the circuit between terminals T-6 and T-7, de-energizing control relay 2CR.

Contacts 2CR-A open, whereby control relay 2CR remains de-energized until contacts 1-LSA are activated. Contacts 2CR-B are opened and time delay TD is de-energized. Contacts TD-A are opened and motor M is de-energized, thereby stopping the descent of chain 26 and hook 14. It will be noted that contacts 2CR-C are also opened, whereby time delay TD is reset for subsequent cycles.

It will also be noted that light 3L is de-energized, indicating the end of the "DOWN" phase of the cycle.

The power stays "ON" until contacts 1PB-A and 1PB-B are opened by manually pulling push-pull button 1PB. Therefore, subsequent cycles may be initiated by momentarily depressing pushbutton 2PB on panel P.

What is claimed is:

1. For use with a trolley hanger which has a rail engaging wheel adapted to be landed on a conveyor rail, and a trolley hanger engaging frame connecting the trolley wheel to a hoisting mechanism, a stabilizer means comprising:

mounting means connected to the conveyor rail; and
    a trolley hanger engaging means mounted on said mounting means so that the engaging frame is located between said trolley hanger engaging means and the rail, said trolley hanger engaging means including abutting means for abuttingly engaging the trolley hanger frame, said abutting means being pivotally connected to said mounting frame to be approximately co-level with the rail, actuator means for actuating said abutting means mounted on said mounting means, said linking means connecting said abutting means to said actuating means in a manner so that said abutting means can be moved from a normal, retracted position spaced apart from the rail a distance sufficient to allow free movement of the trolley when same is located between said abutting means and the rail into a stabilizing position when the wheel is hoisted above the rail by the hoisting mechanism with said abutting means holding the trolley frame in a position to land the trolley wheel on the rail.

2. A stabilizing means called for in claim 1, which includes stop means on the conveyor rail engagable by the trolley hanger when the rail-engaging wheel thereof is in vertical alignment with the conveyor rail.

3. A stabilizing means as called for in claim 2 wherein the trolley hanger is disposed between the stabilizer and the stop means.

4. A stabilizing means as called for in claim 1, which includes a first control member responsive to the presence of a trolley hanger when positioned adjacent and above the conveyor rail for actuating said stabilizer means from said retracted to said stabilizing position.

5. A stabilizing means as called for in claim 4, which includes a second control member responsive to lowering of the trolley hanger to land the wheel thereof on the conveyor rail for actuating said stabilizer mechanism position to said retracted position.

6. A stabilizing means as called for in claim 5, wherein said second control member is engaged and activated by the trolley hanger as the rail engaging wheel thereof lands on the conveyor rail.

7. A stabilizing means as called for in claim 4, wherein the means actuated by the control member comprises a reversible motor.

8. A stabilizing means as called for in claim 7, wherein the reversible motor comprises a cylinder.

9. A stabilizing means as called for in claim 1, which includes control means responsive to predetermined positions of the hoist mechanism for operating the actuator means.

10. A stabilizing means as called for in claim 9, wherein said control means includes a first member which is activated by said hoist mechanism as it lifts the trolley hanger to the elevated position adjacent and above the conveyor rail for moving the stabilizer means into trolley engaging position and for simultaneously stopping the ascent of the hoist mechanism.

11. A stabilizing means as called for in claim 10, wherein said rail engaging wheel is positioned in vertical alignment with the conveyor rail when the stabilizer means engages said trolley hanger, and wherein said control means is operable to initiate descent of the hoist mechanism for landing the rail engaging wheel on the conveyor rail while the said stabilizer means is in engagement with the trolley hanger.

12. A stabilizing means as called for in claim 11, wherein said control means includes a third control member activated in response to descent of the hoist mechanism to a fully lowered position for stopping the said hoist mechanism.

13. A stabilizing means as called for in claim 12, which includes means for automatically releasing the trolley hanger from the hoist mechanism when the rail engaging wheel is landed on the conveyor rail.

14. A stabilizing means as called for in claim 11, which includes guide means associated with said hoist mechanism for maintaining the rail engaging wheel of the trolley hanger in a position intermediate of the conveyor rail and the stabilizer means as the trolley hanger is lifted toward the elevated position and for positioning the said rail engaging wheel in substantial vertical alignment with the conveyor rail when the trolley hanger is in the elevated position adjacent and above the conveyor rail.

15. A stabilizing means as called for in claim 14, wherein said first control member is engaged and activated when said rail engaging wheel is disposed in substantial vertical alignment with the conveyor rail.

16. A stabilizing means as called for in claim 1, which includes a trolley hanger stop secured to and carried by said conveyor rail, wherein said trolley hanger is disposed intermediate of the stop and the stabilizer mechanism when positioned adjacent and above the conveyor rail and is urged against the stop when engaged by the stabilizer mechanism.

17. For use with a trolley hanger which has a trolley wheel adapted to be landed on an overhead rail, an engaging frame connecting a shackle chain to the wheel and a chain block connecting a hoist chain of a hoist mechanism to the engaging frame, a stabilizing means comprising:
   mounting means connected to the overhead rail;
   a stop means connected to the overhead rail so that when the trolley hanger engaging frame is held against said stop means with the trolley wheel located above the rail, the trolley wheel is in position to be landed on the rail; and
   a trolley hanger engaging means mounted on said mounting means so that the engaging frame is located between said trolley hanger engaging means and said stop means, said trolley hanger engaging means including an actuating means mounted on said mounting means, a control arm connected at one end thereof to said actuating means, a pivot pin mounted on said mounting means and connected to said control arm at the other end of said control arm, a projecting arm having a trolley hanger engaging frame abutting means on one end thereof and connected to said control arm by said pivot pin so that said abutting means is located approximately co-level with said stop means, said control arm and projecting arm connecting said abutting means to said actuating means so that said abutting means can be moved from a retracted, normal position spaced from the trolley hanger far enough so that the trolley hanger engaging frame moves freely when same is located between said abutting means and the rail into a stabilizing position with said abutting means engaging the trolley hanger engaging frame and holding same against said stop means for placing the trolley wheel in a position to be landed on the rail.

18. A device for hoisting a trolley hanger to and landing the rail-engaging wheel thereof on an elevated, substantially horizontal conveyor rail, comprising:
   guide means including an upper portion in vertical alignment with said conveyor rail, a lower portion laterally offset from the said conveyor rail, and an intermediate transition portion interconnecting said upper and lower portions;
   a follower in continuous engagement with said guide means and normally disposed in the lower portion thereof, said follower including a chain-receptive, through passageway;
   a hoist chain passing through said passageway;
   abutment means secured to and carried by the chain for engaging and moving said follower with said chain from the lower portion of said guide means through the intermediate portion and into the upper portion thereof for disposing the chain and said abutment means in substantial vertical alignment with said conveyor rail;
   stabilizer means including an abutting means located approximately co-level with the rail, and an actuating means connected to said abutting means to move same between a retracted position and an advanced trolley-hanger-engaging position; and
   control means operable to actuate the stabilizer means from the retracted to the advanced position when said follower is moved from the intermediate portion to the upper portion of said guide means.

19. A device as called for in claim 18, which includes additional control means operable to actuate descent of the hoist chain while the stabilizer means is in the advanced position and operable to actuate the stabilizer means from the advanced to the retracted position upon predetermined descent of the said hoist chain.

20. A device as called for in claim 19, wherein each of said control means includes control members mounted in the path of and actuated when engaged by the follower as it moves in said guide means.

21. A device as called for in claim 18, which includes a trolley hanger stop secured to and carried by said conveyor rail, wherein said stabilizer means is adapted for engaging and urging the trolley hanger toward said stop when in the advanced position, for accurately disposing the rail-engaging wheel of the trolley hanger in vertical alignment with the conveyor rail.

22. A method of hoisting a trolley hanger and landing the rail-engaging wheel of the trolley hanger on an elevated conveyor rail, comprising the steps of:
   a. providing an abutting means located approximately co-level with the conveyor rail;
   b. locating the abutting means in a retracted position spaced from the conveyor rail a distance sufficient to allow free movement of the trolley hanger between the rail and the abutting means;
   c. raising the trolley hanger from a lowered position to a position adjacent and above the conveyor rail;
   d. moving the abutting means from the retracted position into a stabilizing position abutting the trolley hanger and clamping same against the conveyor rail for applying a stabilizing force to the raised trolley hanger to accurately position the rail-engaging wheel thereof in vertical alignment with the conveyor rail; and then
   e. lowering the stabilized trolley hanger for landing the rail-engaging wheel on the conveyor rail.

23. A method as called for in claim 22, wherein the stabilizing force is continuously applied during step (e).

24. A method as called for in claim 23, which includes the step of removing the stabilizing force once the rail-engaging wheel of the hanger has landed on the conveyor rail.

25. A method as called for in claim 22, which includes the step of pausing for a predetermined time interval between steps (d) and (e).

26. A method as called for in claim 22, wherein step (d) comprises urging the trolley hanger into abutting engagement with a trolley hanger stop secured to and carried by the conveyor rail.

27. A method as called for in claim 26, and wherein said stabilizing force is removed by retracting the abutting means from the stabilizing to the retracted position.

28. A method as called for in claim 22, wherein step (c) includes positioning the rail-engaging wheel of the trolley hanger in substantial vertical alignment with the conveyor rail when the trolley hanger is positioned adjacent and above the conveyor rail.

* * * * *